(12) United States Patent
Stouffer et al.

(10) Patent No.: US 9,302,210 B2
(45) Date of Patent: Apr. 5, 2016

(54) COMPOSITE BLOCKS WITH VOID SPACES

(75) Inventors: Mark A. Stouffer, Middletown, CT (US); Eric C. Pemberton, Southington, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 211 days.

(21) Appl. No.: 13/994,787

(22) PCT Filed: Dec. 1, 2011

(86) PCT No.: PCT/US2011/062852
§ 371 (c)(1),
(2), (4) Date: Jul. 8, 2013

(87) PCT Pub. No.: WO2012/082388
PCT Pub. Date: Jun. 21, 2012

(65) Prior Publication Data
US 2013/0277299 A1    Oct. 24, 2013

Related U.S. Application Data

(60) Provisional application No. 61/423,672, filed on Dec. 16, 2010.

(51) Int. Cl.
*B01D 39/20* (2006.01)
*B29C 44/02* (2006.01)

(52) U.S. Cl.
CPC ............ *B01D 39/2062* (2013.01); *B29C 44/02* (2013.01); *B01D 2239/086* (2013.01); *B01D 2239/1216* (2013.01); *Y10T 428/249986* (2015.04)

(58) Field of Classification Search
CPC .................. B01D 39/2062; B01D 2239/1216; B01D 2239/086; B29C 44/02
USPC ..................................... 210/496, 502.1, 510.1
See application file for complete search history.

(56) References Cited

U.S. PATENT DOCUMENTS 5,017,318 A * 5/1991 Vanderbilt et al. ............ 264/113
5,882,517 A * 3/1999 Chen et al. ..................... 210/496
(Continued)

FOREIGN PATENT DOCUMENTS

EP    0 379 378    7/1990
JP    61-220785    10/1986
(Continued)

*Primary Examiner* — Matthew O Savage
(74) *Attorney, Agent, or Firm* — Scott A. Baum

(57) ABSTRACT

A composite block that includes activated carbon particles bonded to one another with a polymeric binder. The block includes a tortuous porous network extending through the block article, the tortuous porous network having a plurality of void spaces interspersed throughout the network with the majority of void spaces each having an average diameter greater than the average diameter of the remainder of the porous network. A filter incorporates the composite block as a part thereof. A process of making a composite block includes mixing activated carbon, polymeric binder and pore forming material to provide a moldable mixture; placing the moldable mixture in a mold cavity; heating the mold cavity and the moldable mixture to melt the polymeric binder; cooling the mold to re-solidify the polymeric binder to form the composite block; and removing the composite block from the mold cavity.

10 Claims, 1 Drawing Sheet

(56) References Cited

U.S. PATENT DOCUMENTS

| | | |
|---|---|---|
| 7,112,272 B2 | 9/2006 | Hughes |
| 7,758,953 B2 | 7/2010 | Koizumi |
| 8,206,627 B2 | 6/2012 | Stouffer |
| 2003/0042197 A1 | 3/2003 | Kondou |
| 2004/0046289 A1 | 3/2004 | Stadermann |
| 2004/0168974 A1* | 9/2004 | Hughes et al. ............ 210/502.1 |
| 2008/0269394 A1 | 10/2008 | Oomura |

FOREIGN PATENT DOCUMENTS

| | | | |
|---|---|---|---|
| WO | WO 98/14265 A1 * | 4/1998 | ......... B01D 39/2062 |
| WO | WO 01/52100 | 7/2001 | |
| WO | WO 2005/118108 | 12/2005 | |
| WO | WO 2007/117943 | 10/2007 | |

* cited by examiner

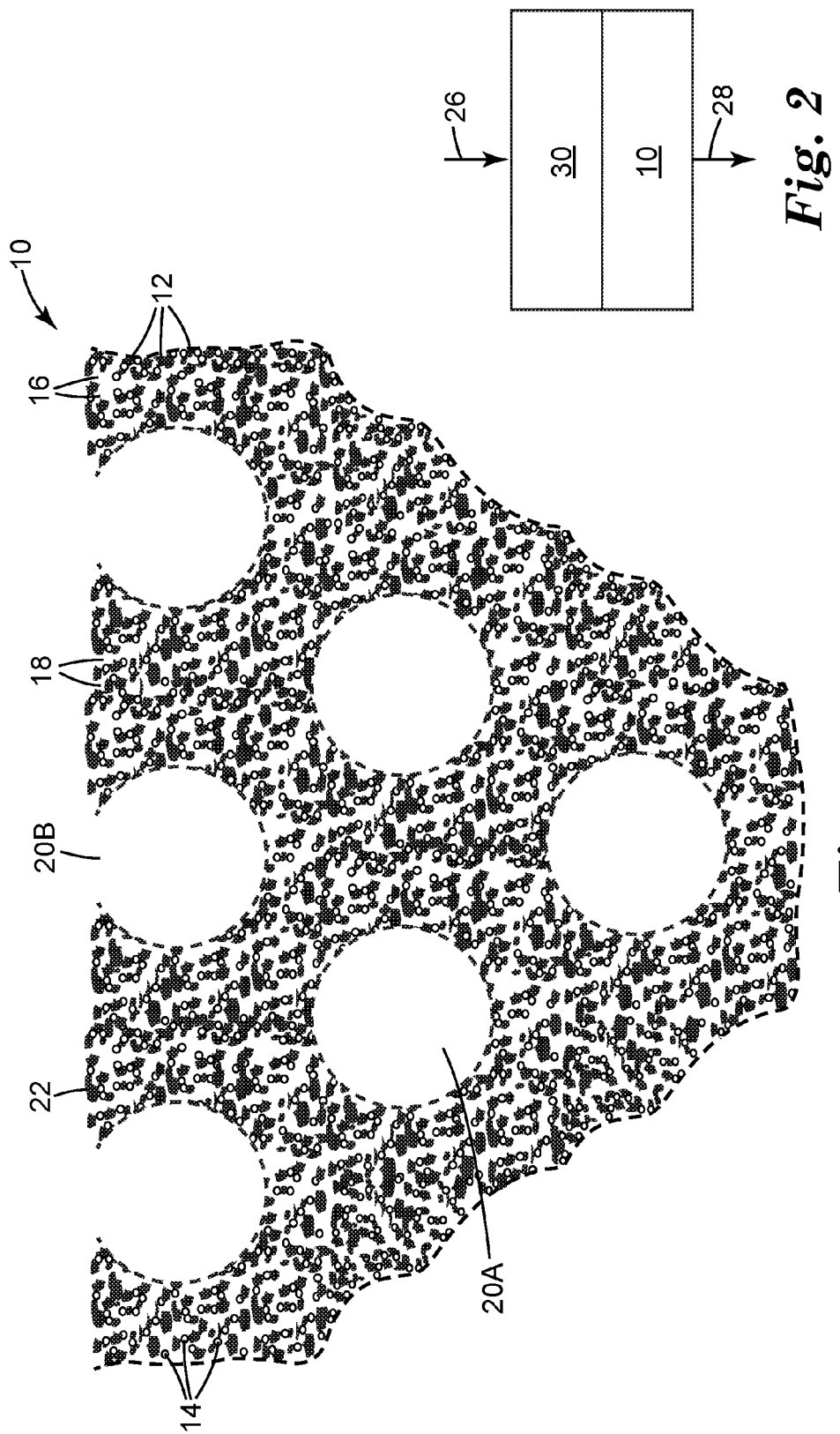

COMPOSITE BLOCKS WITH VOID SPACES

The present disclosure relates to composite blocks useful as filtration media, filters incorporating such composite blocks and methods of making the composite blocks.

BACKGROUND

Composite blocks of adsorptive material are useful as filtration media in the treatment of liquid feed streams such as in water treatment applications, for example. In such applications, composite blocks can include activated carbon particles that are bound together by a polymeric binder material such as one or more polyolefin materials including ultra high molecular weight (UHMW) polyethylene, for example. Composite blocks provide treatment capabilities comparable to and often better than those of a loose bed of carbon particles when used in the removal of organic contaminants from water. Moreover, composite blocks are compact in their construction and can be handled with a reduction in the mess commonly associated with the handling of loose beds of carbon particulate.

Composite blocks may be made for use in any of a variety of filtration applications by including appropriate components in the construction of the block, either in addition to activated carbon or in place of it. Such components can include, for example, ion exchange resin, adsorbent materials; metal ion exchange zeolite sorbents; activated aluminas; silver, zinc and halogen based antimicrobial compounds; acid gas adsorbents; arsenic reduction materials, iodinated resins, textile fibers and the like.

Although composite blocks have been widely applied in a variety of filtration applications, the technology has suffered from long recognized limitations. One such limitation has been in the treatment of filtration feeds having high sediment content. Composite block filtration media that comprise activated carbon have been used for the purification of residential water at the point of entry (POE) to a home, for example. Residential water supplies can have high sediment content, and filtration media comprised of composite block filters (e.g., blocks of activated carbon) have suffered from a low tolerance for such sediment. As a result, composite block filters can completely foul (e.g., become obstructed) within relatively short periods of time following an initial exposure to a high-sediment feed stream containing silt, iron or the like.

A long felt and unmet need has persisted for a composite block construction useful as filtration media which is more resistant to fouling when used in the treatment (e.g., filtration) of feed streams having high sediment content, for methods of making such composite blocks, and for filtration systems comprising such composite blocks.

SUMMARY

The embodiments of the invention provide address the shortcomings of the art and provide composite blocks useful as filtration media and suitable for use in the treatment of liquid feed streams having a relatively high sediment content.

In some embodiments, the invention provides a composite block comprising activated carbon particles bonded to one another with a polymeric binder; and a tortuous porous network extending through the block, the tortuous porous network further comprising a plurality of void spaces therein, the majority of void spaces each having an average diameter greater than the average diameter of the remainder of the tortuous porous network.

In another embodiment, the invention provides a filter comprising at least one composite block as previously described, the composite block being enclosed within a housing having a liquid flow inlet and a liquid flow outlet and configured to direct the flow of liquid through the inlet to the composite block and through the tortuous porous network of the composite block and then through the outlet to exit the filter.

In still another embodiment, the invention provides a method of making a composite block, comprising mixing activated carbon, polymeric binder and pore forming material to provide a moldable mixture; placing the moldable mixture in a mold cavity; heating the mold cavity and the moldable mixture to melt the polymeric binder; and cooling the mold to re-solidify the polymeric binder to form the composite block.

Various terms used herein to describe aspects of the various embodiments of the invention will be understood to have the meaning known to persons of ordinary skill in the art. For clarity, certain terms will be understood to have the meaning set forth herein.

"Pore forming material" refers to a material (e.g., a particulate) that is included as an initial component for making a composite block as described herein. Pore forming materials include materials that facilitate the creation of void spaces within the porous network of the composite block.

"Sediment life" refers to a measurement used to assess the ability of a filtration media to tolerate the presence of particulates within the filtration feed. As used herein, the sediment life is determined in a standard test in which influent water is spiked with A4 fine test dust at a concentration of 0.13 g/gal. The influent water/dust mixture is directed through a filter that comprises the filtration media being tested while the pressure differential across the filter is monitored. Sediment life is established by determining the total amount of test dust fed to the filter from the start of the test until the time when the pressure differential across the filtration media has risen 35 psi above its initial differential pressure measurement.

"Ultra-high molecular weight polyethylene" (UHMW PE) refers to polyethylene having an average molecular weight of about $2\times10^6$ grams per mole (g/mole) or greater.

As used herein, "a," "an," "the," "at least one," and "one or more" are used interchangeably. Thus, for example, an article that comprises "a" membrane can be interpreted to mean that the article includes "one or more" membranes. Any recitation of a numerical range by endpoints includes all numbers subsumed within that range (e.g., 1 to 5 includes 1, 1.5, 2, 2.75, 3, 3.80, 4, 5, etc.).

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The above summary is not intended to describe all possible embodiments of the present invention. Those of ordinary skill in the art will more fully understand the scope of the invention upon consideration of remainder of the description that follows.

DESCRIPTION OF THE DRAWINGS

FIG. 1 illustrates a partial cross-sectional portion outlined by dashed lines of a composite block 10 made of a plurality of activated carbon particles 12 bonded to one another with a polymeric binder 14 forming a plurality of pores 16 between the bound carbon particles; the plurality of pores forming a tortuous porous network 18 extending throughout the composite block 10 with the tortuous porous network 18 having a plurality of void spaces 20A outlined by dashed lines within an internal structure of the tortuous porous network 18 and along an outer surface 22 of the composite block; and the majority of the plurality of void spaces 20A each having an average diameter greater than the average diameter of the plurality of pores 16 in the tortuous network 18; and FIG. 2 illustrates the composite block 10 of FIG. 1 having a liquid flow inlet 26 and a liquid flow outlet 28 and a pre-filter 30 positioned upstream of the composite block 10.

DETAILED DESCRIPTION

Embodiments of the invention provide composite blocks and methods for making such composite blocks. More specifically, embodiment of the invention provide composite blocks, useful as filtration media, formed from adsorptive media (e.g., activated carbon and the like), and polymeric binder. The composite blocks are useful in the filtration of liquids including, for example, the filtration of water feed streams. The composite blocks described herein include a tortuous network of pores extending throughout each block, the network of pores also incorporating a plurality of void spaces therein, the majority of such void spaces having an average diameter greater than the average diameter of the remainder of the pores. The composite blocks can be used as a filtration media in any filtration application wherein the feed stream includes significant amounts of particulate material (e.g., sediment). The composite blocks described herein are useful for filtering liquid feed streams including water feed streams such as those at the point of entry (POE) to a home, for example. The composite blocks comprise highly porous structures with void spaces that endow the blocks with substantially higher tolerances for sediment levels than has previously been available. In other embodiments, a system is provided that incorporates the forgoing composite block as a filtration media. Other embodiments provide a method of making the foregoing composite blocks. In various embodiments, a method of making includes molding the composite blocks and, in some embodiments, molding is accomplished, in part, using an impulse filling technique to of a mold followed by further processing to form the composite blocks.

Composite blocks are typically formed in a cylindrical configuration with an inner diameter and a outer diameter. Fluid flow through a composite block can be directed from the inner diameter, through the composite media (e.g., activated carbon) and exiting from the outer surface of the block. In other configurations, flow can be directed from the outer surface, through the composite filtration media and into the inner diameter of the block. Either of the foregoing flow configurations may be suitable for the embodiments of composite blocks described herein. A composite block filtration media is typically placed in a housing that is configured to direct the flow of fluid through the composite material, as previously described.

Composite blocks made of activated carbon from various sources often include relatively small interstices, or pores, between the bound carbon particles that form a tortuous and complex porous pathway through which a liquid feed stream can pass during a filtration operation. Composite blocks can have relatively smooth outer surfaces because the size and shape of activated carbon particles often permits a dense packing of the particles during formation of the block. Smaller particles of activated carbon, once arranged in a tight packing of materials in a composite block, typically provide the block with reduced pore sizes. As a result, the composite block can act as a surface filter rather than a depth filter because the surface pore sizes are too small to allow the passage of sediment. As a result, the filter will quickly become plugged (e.g., it will foul).

In embodiments of the invention, composite blocks are provided that comprise a number of components including activated carbon particles, binder material and optional other components. In such embodiments, the composite block includes a porous network extending therethrough, wherein the porous network further includes discrete void spaces, each such void space having an average diameter greater than the average diameter of the remainder of the porous network. In some embodiments, the average diameter of the void spaces in a composite block may be about one millimeter, in some embodiments about two millimeters and in some embodiments about three millimeters. Both larger and smaller void spaces are also within the scope of the disclosure, and a composite block may comprise a plurality of void spaces having different sizes and/or shapes. The void spaces include first void spaces 20 A that are located within the internal structure of the porous block and spaced apart from an outer surface of the porous block as well as second void spaces 20B that are located along the outer surface of the composite block. In various embodiments, void spaces are large enough to be visible to the human eye when viewing the surface of the composite block as well as being visible throughout the block's construction (e.g., when viewing a cross-sectioned portion of a composite block).

Void spaces within the embodiments of the composite blocks described herein are the result of using pore forming material during the process of making the composite block. Pore forming material(s) may be selected from any of a variety of particulates, as described further herein, so long as the pore forming material is capable of being dissolved, melted, decomposed or otherwise treated so that each particle of pore forming material is removed, its volume is greatly reduced, or it is otherwise physically altered so as to leave a void space in the finished composite block.

Composite blocks according to the embodiments of the invention are useful as filtration media when disposed within a system for liquid filtration applications. In the various embodiments herein, composite blocks are made of activated carbon particles, binder (e.g., polymer), one or more optional materials and a plurality of void spaces distributed throughout a porous network. The presence of void spaces endows a composite block with an improved tolerance for the presence of sediment in a liquid feed stream so that the composite blocks experience a longer useful life as filtration media in the filtration of liquid streams with significant levels of particulate (e.g., sediment).

It will be appreciated that a composite block for filtration can include a variety of materials depending on the specific filtration application being contemplated for the block. In addition to activated carbon, embodiments of the invention can optionally include lead removal media, diatomaceous earth, antimicrobial media or agents, silica, zeolite, alumina, ion exchangers, arsenic removal media, molecular sieves, charge modified particles, titanium silicates, titanium oxides, and metal oxides, metal hydroxides, and combination of two or more of the foregoing. It will be understood that the foregoing list of optional components is exemplary but not exclusive. In some embodiments, the main component in the composite bock is activated carbon.

Binder material useful in the foregoing composite blocks may be selected from known materials including, without limitation, polyolefin binder materials such as polyethylene binder. A suitable polyethylene is ultra-high molecular weight polyethylene binder, for example. Polyethylene may comprise low density polyethylene, high density polyethylene and combinations thereof. In addition, polypropylene may be a suitable binder and may also be in the form of low density polypropylene, high density polypropylene or combinations thereof. While the foregoing polyolefin binders are most typically employed, other suitable binders will be known to those of ordinary skill in the art, and all such binders are within the scope of the present disclosure. In some embodiments, the overall or total binder content for a composite block made according to the present disclosure is typically between about 5 wt. % and about 40 wt. %, in some embodiments, between about 10 wt. % and about 25 wt. %, and in some embodiments between about 15 wt. % and about 20 wt. %, on a dry weight basis.

Additional components may be included in the composite block, as may be required or desired in a specific product application. The inclusion of specific materials in a composite block, and particularly additional adsorptive materials, is well within the skill of one of ordinary skill in the art. In other embodiments of the invention, a filter is provided comprised of one or more of the foregoing composite blocks in a housing that surrounds or encloses the block(s), such housing including a liquid flow inlet and a liquid flow outlet, and the filter is configured to direct the flow of liquid through the inlet to the composite block and through the tortuous porous network of the composite block and then through the outlet to exit the filter.

The composite block(s) may be the sole filtration media in the system, or the block(s) may be operatively associated with one or more other forms of filtration media including, for example, pleated filtration media, membrane(s), one or more beds of particulate media (e.g., ion exchange resin) or the like. Depending on the specific application, the additional media may be located upstream or downstream from the composite block(s). In embodiments wherein the system is used in a filtration application for the treatment of a liquid feed stream having high sediment content, the composite block may be the primary filtration media. However, an upstream prefilter may be included within such a system and/or a downstream media may be used for additional filtration or treatment of the feed stream. In some embodiments, the composite block may be used as a downstream filtration media such as, for example, in water softening systems In embodiments of the invention, the composite blocks are useful as filtration media for any of a variety of fluids and/or liquids capable of being processed through composite carbon block filters, including, not limited to, potable water, non potable water, industrial liquids and/or fluids or the like. In some embodiments, the composite blocks of the invention are useful for the filtration of water streams such as those used to supply water in residential or commercial settings. In such embodiments, the block may principally comprise activated carbon and ultra high molecular weight polyethylene binder as the principal components.

Suitable activated carbon particles in the embodiments of composite blocks described herein may be obtained from any of a variety of sources. In embodiments where the composite block will be used in the filtration of water, activated carbon derived from ground nutshells can be used. Exemplary commercial materials are the activated carbon materials commercially available from Kuraray Co., Ltd of Japan under the designations "PGW" and "PGWH", for example. In some embodiments, a single grade of activated carbon may be used by itself with binder (e.g., UHMW PE). In other embodiments, additional grades or a mixture of different grades of activated carbon may be included in the composite block. Optional components mentioned previously may also be present. In some embodiments, the activated carbon is present in the composite block at a concentration of from about 95 wt. % to about 50 wt. %, in some embodiments from about 90 wt. % to about 75 wt. %, and in some embodiments from about 85 wt. % to about 75 wt. %, on a dry weight basis.

Pore forming material is an initial component included in the making of composite blocks according to the various embodiments of the invention. Suitable pore forming materials may be selected from any of several classes of materials in order to provide void spaces and an enhanced surface roughness in the final composite block. In some embodiments, for example, pore forming materials may include foamed polymer materials that reduce in volume upon heating (e.g., during a molding operation to make the composite block). In some embodiments, foamed or expanded polymer beads are suitable pore forming materials such as expanded polypropylene, expanded polyethylene, expanded polystyrene, combinations of the foregoing, and the like. In other embodiments, suitable pore forming materials may include water-soluble materials that can be washed out of a composite block structure, thus leaving void spaces in their space.

In one embodiment, water-soluble particles may be used as pore forming material. In some embodiments, suitable water-soluble materials include scale-inhibiting agents (e.g., inorganic polyphosphates). Initially, the scale-inhibiting agent is incorporated into the porous structure of the composite block. In such an embodiment, a portion of the inorganic salt may be at least partially dissolved by flushing the composite block with water prior to using the block as a filtration media. Partial dissolution of the salt will initiate the formation of void spaces, and even more void spaces will form as the water-soluble particles dissolve further while being used in a filtration application. When polyphosphate is used as a pore forming material, it will act to inhibit the formation of scale as it dissolves. Additionally, the polyphosphate will eventually be dissolved by the flow of water through the porous network of the block. As each phosphate particle dissolves from the porous network of the composite block, a void space is created, and, with each void apace, the composite block gains an enhanced tolerance for sediment in the feed stream.

Other suitable pore forming materials include by way of example other inorganic salts, hollow beads made of brittle material or materials having a low melting point may also be used. Additionally, combinations of pore forming materials may be used such as a combination of expanded polymer beads and water-soluble particles, for example. As will be appreciated by those of ordinary skill, a material may be suitable for use as a pore forming material so long as the material is capable of being reconfigured from a first state (e.g., an expanded foam, an soluble particle, a hollow bead, etc.) to a second state (e.g., a collapsed foam, dissolved particle, a collapsed or broken bead, etc.) during the manufacture of the composite block and/or during the use of the composite block in order to form a void within the porous network of the composite block.

In embodiments of the invention, a method for making composite blocks is provided. Initially, the components of the composite block are placed in a container suitable for mixing the components to provide a substantially uniform composition which may be further processed to provide the composite block. Suitable containers will be selected by those of ordinary skill in the art based on the volume of materials needed, the types of materials included in the composite block, and the like. In some embodiments, the component materials may be mixed directly within a mold cavity, for example. In fact, in various embodiments of making the composite blocks described herein, a molding technique is employed which utilizes the "impulse filling" of a mold. Impulse filling applies a limited series of discrete displacements to the mold or to the table or surface on which the mold sits. The making of composite blocks by methods utilizing impulse filling is further described in co-owned U.S. patent application Ser. No. 11/690,047 (the '047 application) entitled SYSTEMS AND METHODS OF MAKING MOLDED COMPOSITE BLOCKS, the entire disclosure of which is incorporated herein by reference. While vibration of a mold involves a high rate of displacements—i.e., a frequency greater than about 600 displacements per minute—impulse filling utilizes a low rate of displacements, typically using a frequency in the range 5 to 120 displacements per minute. In some embodiments, the displacements are at a rate of about 20 displacements per minute (e.g., every 3 seconds). In other embodiments, the displacements are at a rate of about 30 displacements per minute (e.g., every 2 seconds). In general, impulse filling has provided an improved approach to achieving a maximum uncompressed density for powder components contained in a mold, such as the mixture of UHMW PE, pore forming material and filtration media (e.g., activated carbon) used to provide the composite blocks described herein. It has been found that by replacing vibration with impulse filling, higher density products can be made with fewer crack formations occurring in the end product composite blocks. It was also found that impulse filling allows for the manufacture of composite blocks utilizing less binder than was previously needed using prior manufacturing techniques, and impulse filling typically results in less variability in the mold fill weight and less variability in the porosity and liquid flow properties of the final composite block.

In some embodiments, the process of making composite blocks using the foregoing impulse filling method optionally includes an axial compression step either during or after baking of molds. The compression step is controlled to compress the material within the mold cavity to a fixed length. As is described in the aforementioned '047 application, the compression step can be advantageous because: (1) the composite block is molded to its final shape, eliminating the need for further processing and reducing scrap; and (2) when combined with impulse filling, the density and the porosity of the composite block are highly uniform, often allowing for the manufacture of composites with more controlled performance characteristics.

In an embodiment of a process for making composite blocks, the process includes impulse filling and molding of the blocks. The embodiment includes, the steps: (1) weighing the components including activated carbon, binder and other optional components (e.g., lead reduction media, pore forming material) into a suitable vessel (e.g., a drum) and stirring the contents of the vessel by rapid stirring at predetermined rate for a predetermined amount of time to ensure thorough mixing of the components; (2) taking the resulting mixture and filling one or more mold cavities; (3) with the molds secured to a table or other surface, the molds are filed while subjecting the table or surface to discreet vertical displacements (e.g., using a pneumatic rapper or a hammer to strike the table or surface). In some embodiments, vertical displacements (impulses) are applied on the table or surface approximately every 2 seconds for about three minutes, or until the material in the mold is completely compacted. (4) Heating the molds in a convection oven for a period of time as determined by the diameter of the mold and typically within the range of from about one hour to about two hours; and (5) cooling the molds to room temperature. The resulting composite blocks are then ejected from the molds.

As known by those of ordinary skill in the art, the resulting composite blocks are then made into filters by gluing end caps on the carbon blocks and inserting the end capped blocks into housings.

In an optional specific aspect of the disclosure, molds are filled to a reproducible maximum uncompressed density by impulse filling, as described. The molds are then heated and are compacted by a fixed axial distance to provide composite blocks with a uniform density and porosity. In this manner, the resulting composite blocks are typically uniform across their length and can have better flow properties and filtration performance and may be less susceptible to preferential flow. Further, molding blocks to a uniform density across their length can facilitate the manufacture of longer blocks and it can also allow useful composite blocks to be cut from longer sections of composite material as a cost savings measure.

Molds subjected to axial compression typically allow for less shrinkage of material so that the material doesn't appreciably shrink from the walls of the mold during cooling, and the reduced shrinkage typically requires an increase in force to remove a composite blocks from its mold. In the absence of equipment modifications to facilitate the removal of the composite blocks upon the completion of the manufacturing process, the increased force during ejection of the molded composite block may possibly damage the mold. To address these problems, some embodiments of the process of making composite blocks utilize a mold that is slightly tapered in the axial dimension. The taper can be machined into a mold cavity and, in some embodiments; a suitable taper may be between about ½ to about 1 degree. The resulting composite will have a wider diameter at one end than at the other end thereof. In some embodiments, a taper of about 0.8 degrees or about 1 degree over about 25% of the carbon block length is sufficient to form composite blocks using axial compression which can then be removed from the molds with substantially less force than would be required in the absence of such a taper. In the absence of the foregoing taper, the composite blocks may be removed from the mold cavities by ejection using higher force, using highly polished molds, or coating the mold surfaces with a release coating that reduces the required ejection force.

Additional aspects of the foregoing embodiments are illustrated in the following non-limiting Examples.

EXAMPLES

Unless indicated otherwise, all parts and percentages are given as weight percentages.

Procedures

Except as otherwise noted, the following procedures were employed in the Comparative Examples and the inventive Examples.

Procedure for Making Composite Blocks

Weighed amounts of activated carbon, binder and other components (e.g., lead reduction media, pore forming material) were charged into a 5-gal drum. The contents of the drum were mixed by rapid stirring at a rate of about 600 rpm for about 3 minutes. The resulting mixture was filled into molds (aluminum pipe with top and bottom plate and mandrel), and the molds were secured to a filling table. Molds were filled while subjecting the table to discreet vertical displacements, for example using a pneumatic rapper or a hammer. Vertical displacements (or impulses) were applied on the table approximately every 2 seconds for about three minutes, or until the material in the mold was completely compacted. The molds were then heated in a convection oven. Heating time depended on the diameter of the mold and typically ranged 1-2 hours. The molds were cooled to room temperature and the resulting composite blocks were ejected from the molds. The resulting composite blocks were made into water filters by gluing end caps on the composite blocks and inserting the end capped blocks into housings.

Procedure to Determine Sediment Life

A test method was used to evaluate the sediment life of filters when exposed to particulate in influent water feeds. Influent water was spiked with A4 fine test dust (ISO 12103-1 test dust, supplied by Particle Technology Inc.) at a concentration of 0.13 g/gal. Differential pressure was monitored throughout the test. The sediment life was reported as the grams of dust throughput to the filter until the pressure drop across the filter rose 35 psi above the initial pressure drop.

Comparative Example A

A commercially available point of entry filter (obtained from 3M Purification Inc.) identified as product AP917 "Whole House Filter System" was tested as a comparative example. This product consisted of activated carbons (obtained from Kuraray and designated as "PGWH") and UHMW PE binder (obtained from Ticona under the designation "GUR") and was in the form of a 16.8" long composite block wrapped with a pleated prefilter. The diameter of the block with the pleat pack was about 3.5 inches. The product had a rated chlorine life of 100,000 gal at a flow rate of 10 gpm.

Sediment life was evaluated using the procedure described above. The measured sediment life for the commercial filter was 9 grams. An inspection of the filter after the Sediment life test indicated that particulate built up on the outer surface of the composite block caused rapid plugging of the media.

Comparative Example B

The commercially available product of Comparative Example A was tested using the Sediment life test according to the above procedure, but the pleated prefilter was first removed. Sediment life was 9 gram. Examination of the filter after testing showed a smooth surface of a carbon block made by standard processing.

Comparative Example C

Composite blocks were made according to the above procedure using a coarse activated carbon. The blocks consisted of 10% activated carbon (Kuraray PGWH, having a particle size of 20×40 mesh) and 90% binder (Ticona GUR 2126 UHMW PE). Molds were filled by impulse filling. The blocks were not compressed in order to give a more "open" structure. Sediment life was tested according to the described procedure and the measured sediment life was 14-22 gram.

Example 1

Composite block were made according to the above procedure. The blocks were formulated by blending 84 wt % activated carbon (Kuraray Carbon PGWH 60×150 mesh); 10 wt % UHMW PE (Ticona GUR 2126); 6 wt % expanded polypropylene beads (obtained commercially from JSP Corporation under the designation "ARPRO EPP", Lot 5495) as a pore forming material having an approximate density of 0.1 g/ml and an average particle size of 2.5 mm. Blocks were molded to 3.5" outside diameter and 0.75" inside diameter. Molds were filled by impulse filling and cured at 200° C. to assure melting of the polypropylene beads. Upon curing, the polypropylene beads left larger pores and surface roughness in the carbon monolith. The resulting composite blocks were tested for sediment life using the above procedure, and the measured sediment life was 73 gram for a 16.8" long block. Inspection of the block suggested that particulate in the influent water was captured both on the surface of the block and throughout the depth of the block because of the presence of the void spaces.

Example 2

Composite blocks were made according to the above procedure. The blocks were formulated by blending 81 wt % activated carbon (Kuraray Carbon PGWH 60×150 mesh); 8 wt % UHMW PE (Ticona GUR 2126); 10 wt % UHMW PE (Ticona GUR 4150-3); and 1 wt % expanded polystyrene beads (commercially available from American Foam and Packaging Inc. Phoenix, Ariz. under the designation "EPS BBF Virgin") as a pore forming material having an approximate density of 0.012 g/ml and an average particle size of 2 mm. Blocks were molded to 3.5" outside diameter and 0.75" inside diameter. Molds were filled by impulse filling and were cured at 175° C. Upon curing the polystyrene beads left visible void spaces in the carbon monolith and also increased surface roughness. The blocks were tested for sediment life using the method described above, and the measured sediment life was 1170 gram for a 16.8" long block.

Example 3

Composite block were made according to the above procedure. The blocks were formulated by blending 68 vol. % activated carbon (Kuraray Carbon PGWH 60×150 mesh); 18 vol. % UHMW PE (Ticona GUR 2126); and 14 vol. % granular polyphosphate scale inhibitor (obtained from BK Giulini GmbH under the trade designation "SiliPhos") which was intended to also act as a pore forming material. Blocks were molded to 3.5" outside diameter and 0.75" inside diameter. In this Example, the concentrations of components are given in volume % because of large density differences between components. Molds were filled by impulse filling and were cured at 175° C. The composite blocks were flushed with water for 4 days (24 hours per day) and were tested for sediment life using the method described above. The measured sediment life was 14 grams for a 16.8" long block. A higher sediment life would be expected in field applications with longer on stream time.

Although various embodiments have been described, it is to be understood that the described embodiments are merely illustrative of the principles and applications of the present invention. It will be apparent to those of ordinary skill in the art that various modifications and variations can be made to the described embodiments without departing from the spirit and scope of the invention. Thus, it is intended that the present invention include modifications and variations, both foreseen and unforeseeable, which are within the scope of the appended claims and their equivalents.

What is claimed:
1. A composite block comprising:
 a plurality of activated carbon particles bonded to one another with a polymeric binder forming a plurality of pores between the bound carbon particles, the plurality of pores forming a tortuous porous network extending throughout the composite block;
 the tortuous porous network further comprising a plurality of void spaces, wherein the plurality of void spaces includes first void spaces and second void spaces, wherein the first void spaces are located within an internal structure of the composite block and are spaced apart from an outer surface of the composite block, and wherein the second void spaces are located along the outer surface of the composite block and are separate from said first void spaces; and wherein a majority of the plurality of first void spaces each have an average diameter greater than the average diameter of the plurality of pores in the tortuous porous network, and wherein the plurality of first void spaces have an average diameter of at least about 1 millimeter.

2. The composite block of claim 1, wherein the plurality of first void spaces having an average diameter from about 1 millimeter to about 3 millimeters.

3. The composite block of claim 1, wherein the plurality of first void spaces having an average diameter greater than about 3 millimeters.

4. The composite block of claim 1 wherein a sediment life test of the composite block has at least twice the total amount of a test dust fed to the composite block from a start of the test until a time when a pressure differential across the composite block has risen 35 psi above its initial differential pressure than a composite block without the plurality of void spaces.

5. The composite block of claim 1 wherein a sediment life test of the composite block has at least three times the total amount of a test dust fed to the composite block from a start of the test until a time when a pressure differential across the composite block has risen 35 psi above its initial differential pressure than a composite block without the plurality of void spaces.

6. The composite block of claim 1 wherein the plurality of void spaces are formed by a pore forming material.

7. The composite block of claim 1 wherein the composite block is formed from a moldable mixture comprising activated carbon, a polymeric binder and a pore forming material that is placed in a molded cavity and heated to bond the plurality of carbon particles to one another.

8. The composite block of claim 1, further comprising one or more additional components selected from the group consisting of lead removal media, diatomaceous earth, antimicrobial media or agents, silica, zeolite, alumina, ion exchangers, arsenic removal media, molecular sieves, charge modified particles, titanium silicates, titanium oxides, and metal oxides, metal hydroxides and combination of two or more of the foregoing.

9. A filter comprising at least one composite block according to claim 1, the filter having a liquid flow inlet and a liquid flow outlet, whereby liquid can flow through the inlet to the composite block and through the tortuous porous network of the composite block and then through the outlet to exit the filter.

10. The filter of claim 9 further comprising a prefilter positioned upstream of the composite block.

\* \* \* \* \*